US011907750B2

(12) United States Patent
Shekar et al.

(10) Patent No.: US 11,907,750 B2
(45) Date of Patent: Feb. 20, 2024

(54) RATE LIMITING OF CLOUD ACCOUNT CHANGE EVENTS AND STATE MANAGEMENT

(71) Applicant: VMware LLC, Palo Alto, CA (US)

(72) Inventors: Ajay Shekar, San Francisco, CA (US); Deep Pradeep Desai, Sammamish, WA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/988,356

(22) Filed: Nov. 16, 2022

(65) Prior Publication Data

US 2023/0155912 A1 May 18, 2023

Related U.S. Application Data

(60) Provisional application No. 63/279,793, filed on Nov. 16, 2021.

(51) Int. Cl.
*G06F 9/455* (2018.01)

(52) U.S. Cl.
CPC .................... *G06F 9/45558* (2013.01); *G06F 2009/45595* (2013.01)

(58) Field of Classification Search
CPC ............. H04L 43/0876; H04L 41/5064; G06F 9/45558; G06F 2009/45595
See application file for complete search history.

(56) References Cited

U.S. PATENT DOCUMENTS

| | | | | |
|---|---|---|---|---|
| 7,437,440 | B2 | 10/2008 | Manion et al. | |
| 10,700,950 | B2 | 6/2020 | Hsiao et al. | |
| 11,296,951 | B2 | 4/2022 | Hsiao et al. | |
| 2019/0026137 | A1 * | 1/2019 | Alexandrov | H04L 41/0895 |
| 2020/0097318 | A1 * | 3/2020 | Alexandrov | H04L 41/0895 |
| 2021/0184948 | A1 | 6/2021 | Baker et al. | |
| 2023/0308853 | A1 * | 9/2023 | Ding | H04W 8/18 455/418 |

* cited by examiner

*Primary Examiner* — Dhairya A Patel
(74) *Attorney, Agent, or Firm* — Quarles & Brady LLP

(57) ABSTRACT

Rate limiting of cloud account change events and state management is described herein. One embodiment includes instructions to process each of a first stream of change events received from a cloud provider and associated with any assets of a particular public cloud account, determine that the first stream of change events exceeds a rate threshold, discard each of a second stream of change events received from the public cloud provider and associated with any assets of the particular public cloud account, query the cloud provider to perform a collection on all the assets of the particular public cloud account after a particular delay period, and process each of a third stream of change events received from the cloud provider and associated with any assets of the particular public cloud account responsive to a completion of the collection.

20 Claims, 3 Drawing Sheets

RATE LIMITING OF CLOUD ACCOUNT CHANGE EVENTS AND STATE MANAGEMENT

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

A software defined data center (SDDC) can include objects, which may be referred to as virtual objects. Virtual objects, such as virtual computing instances (VCIs), for instance, have been introduced to lower data center capital investment in facilities and operational expenses and reduce energy consumption. A VCI is a software implementation of a computer that executes application software analogously to a physical computer. Virtual objects have the advantage of not being bound to physical resources, which allows virtual objects to be moved around and scaled to meet changing demands of an enterprise without affecting the use of the enterprise's applications. In a software defined data center, storage resources may be allocated to virtual objects in various ways, such as through network attached storage (NAS), a storage area network (SAN) such as fiber channel and/or Internet small computer system interface (iSCSI), a virtual SAN, and/or raw device mappings, among others.

A customer may have one or more cloud accounts with a cloud provider (e.g., a public cloud provider). Cloud accounts can be monitored and/or modeled by a monitoring platform to provide security, for instance. The monitoring and/or modeling may be enabled through "change events" received from the cloud provider.

DETAILED DESCRIPTION

Figure 1:
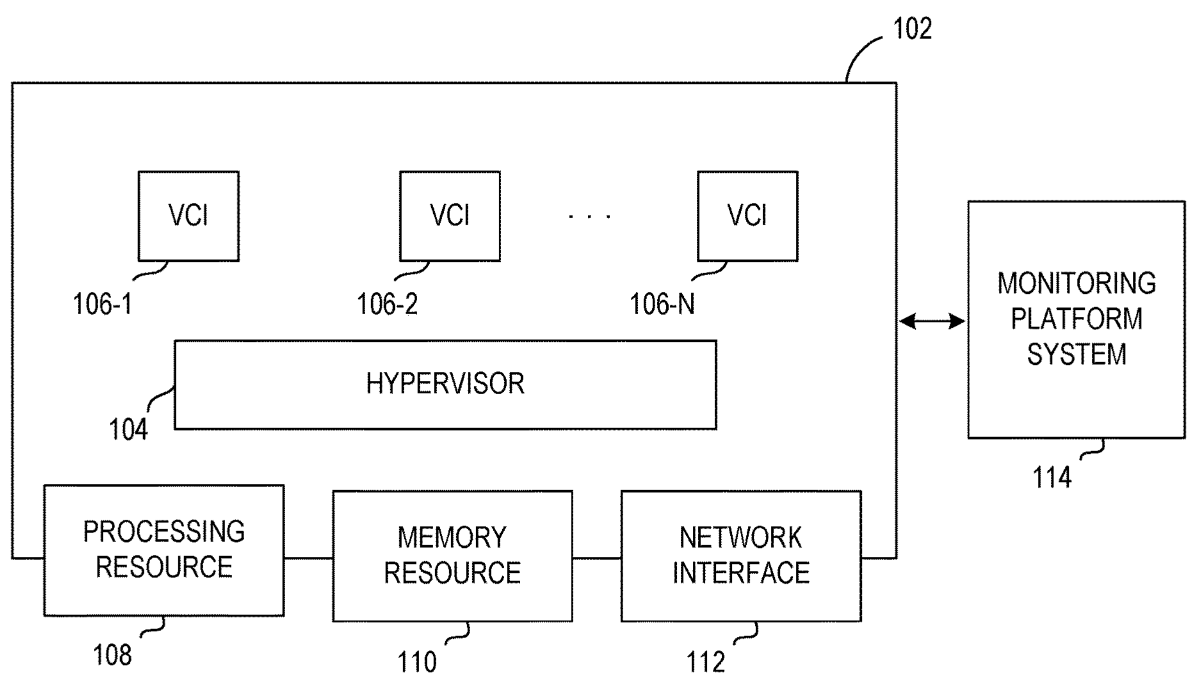
FIG. 1 is a diagram of a host and a system for rate limiting cloud account change events and state management according to one or more embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

Where the present disclosure refers to VCIs, the examples given could be any type of virtual object, including data compute node, including physical hosts, VCIs, non-VCI containers, virtual disks, and hypervisor kernel network interface modules. Embodiments of the present disclosure can include combinations of different types of virtual objects (which may simply be referred to herein as "objects"). As used herein, a container encapsulates an application in a form that's portable and easy to deploy. Containers can run without changes on any compatible system—in any private cloud or public cloud—and they consume resources efficiently, enabling high density and resource utilization. Although containers can be used with almost any application, they may be frequently associated with microservices, in which multiple containers run separate application components or services. The containers that make up microservices are typically coordinated and managed using a container orchestration platform.

As used herein, a "disk" is a representation of storage policy resources that are used by an object. As used herein, "storage policy resource" includes secondary or other storage (e.g., mass storage such as hard drives, solid state drives, removable media, etc., which may include non-volatile memory). The term "disk" implies a single physical memory device being used by an object.

A customer may have one or more cloud accounts with a cloud provider (e.g., Amazon Web Services (AWS), Azure, Google Cloud Platform (GCB), etc.). In accordance with the present disclosure, a monitoring platform, such as Cloudhealth Secure State (CHSS), can uncover configuration related security threats by maintaining a model (e.g., a graph model) of cloud accounts. By modeling the asset inventory of a cloud account in an interconnected, graph database, a monitoring platform makes it easier to inspect resources, metadata, relationships, and changes. For instance, different paths a criminal can take to access sensitive data or escalate privileges to hijack cloud accounts can be visualized.

A "change event" as referred to herein, is a message that is sent to the monitoring platform from a cloud provider when a read action, write action, update action, and/or delete action takes place in a cloud account monitored by the monitoring platform. Change events can enable real time updates to the model and uncover security vulnerabilities that the change may have introduced. In some embodiments, a change event received from a cloud provider can include a timestamp, a source, an event name, a subject and/or description, a timestamp of the event, and an identifier (e.g., a unique ID of the resource associated with the change event).

Traditionally, there are two ways in which a graph model in a monitoring platform is updated. In some instances, a change event triggers a collection for the particular resource that the change concerns. In other instances, a full account-wide collection results in querying the current state of all resources in a cloud account.

However, there may be issues associated with processing change events. For instance, there may be limits to the number of change events that can be processed by the underlying data pipeline in the monitoring platform. This bottleneck, if exceeded, can have negative results. For instance, a backlog of processing change events can be created, causing delays in discovering security vulnerabilities. Additionally, because monitoring platforms may have shared infrastructure for customers, if one customer's cloud account sends a high rate of change events, it could negatively impact another customer's latency in uncovering security vulnerabilities.

Embodiments of the present disclosure can enable a more stable platform and a more predictable latency for processing change events by rate limiting change events. A rate limiting solution in accordance with embodiments herein can utilize a version of a sliding window algorithm in order to set limits on the number of change events the monitoring platform processes per cloud account. In addition to rate limiting, embodiments of the present disclosure include a mechanism to update the state of a cloud accounts graph model in a monitoring platform.

As discussed further below, when an account exceeds a particular rate threshold, a flag indicating that the account has change events disabled can be created. This flag may be referred to herein as "eventswitch." For any received future change event for the cloud account, if the eventswitch indicates that change events are disabled for the account, then the change event is dropped or discarded (e.g., not stored). In order to get the state of the model current, a collection can be performed for all assets (e.g., resources) in the cloud account. Once the collection is completed, the state of the cloud account in the monitoring platform database is up to date. After the completion of the collection for all the assets in the cloud account, the eventswitch can be set to "enabled" for the cloud account, which indicates that change events can be processed for the cloud account.

Additionally, though the present disclosure discusses limiting (e.g., not processing) change events that are associated with a particular cloud account, embodiments herein are not so limited and can be used more granularly. In some embodiments, for instance, change events can be limited based on the type of event rather than just by account. For example, change events related to reads by a particular account can be limited. In some embodiments, change events related to a type of asset, or to a specific asset, can be limited.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 414 in FIG. 4. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of a host and a system for rate limiting cloud account change events and state management according to one or more embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of virtual computing instances 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. The host 102 can be in communication with a monitoring platform system 114. An example of the monitoring platform system is illustrated and described in more detail below. In some embodiments, the monitoring platform system 114 can be a server, such as a web server.

Figure 2:
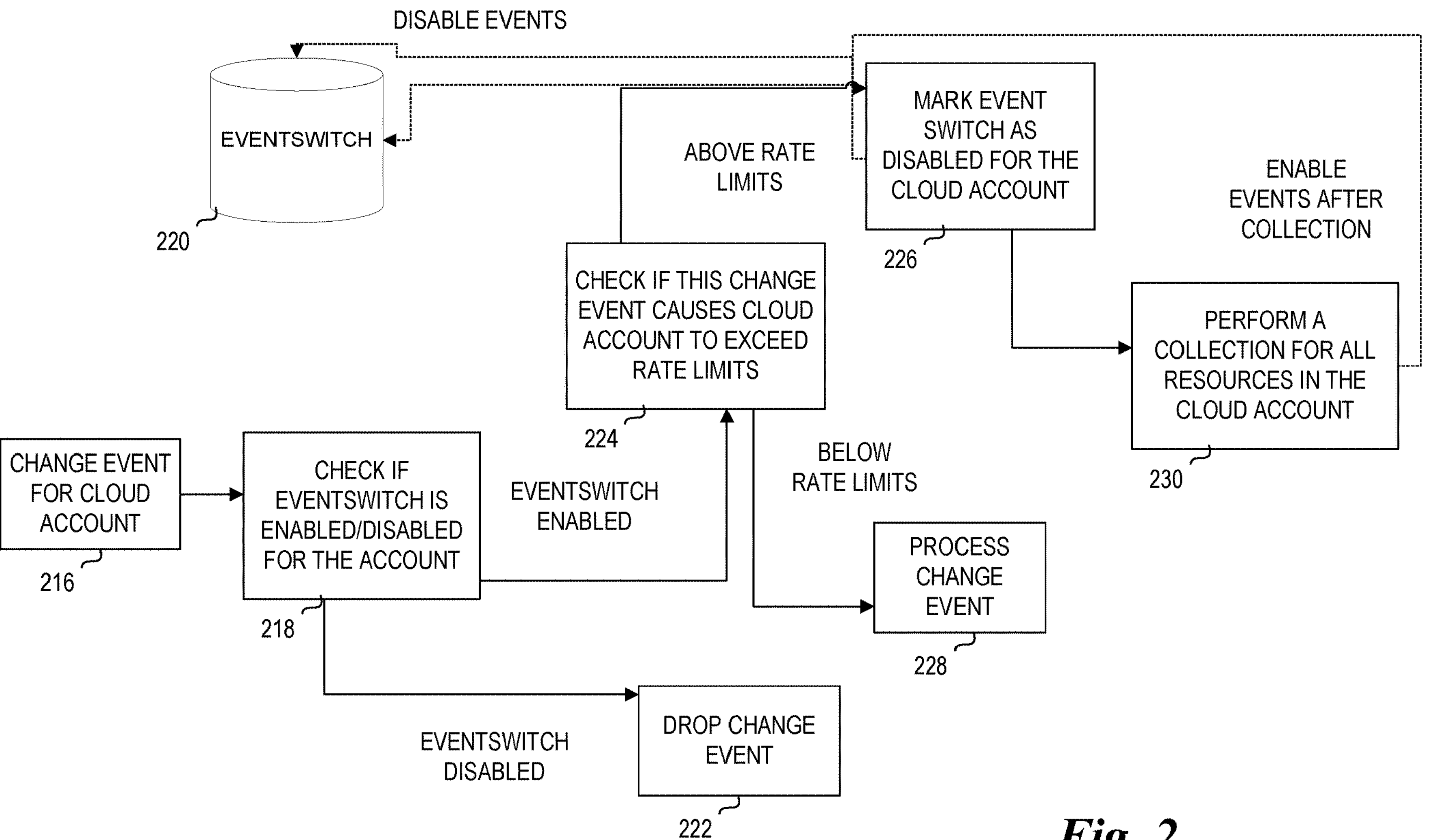
FIG. 2 is a flow chart associated with rate limiting cloud account change events and state management according to one or more embodiments of the present disclosure.

FIG. 2 is a flow chart associated with rate limiting cloud account change events and state management according to one or more embodiments of the present disclosure. At 216, a change event for a cloud account is received. The change event can be received from a cloud provider (e.g., AWS, Azure, GCB, etc.). In some embodiments, the change event triggers collection for the particular resource associated with the change. At 218, a determination is made regarding whether eventswitch is enabled or disabled for the cloud account. If eventswitch is disabled, the change event is dropped and/or discarded at 222. If eventswitch is enabled, a determination is made at 224 whether the change event causes the cloud account to exceed a rate threshold. In some embodiments, a sliding window (e.g., Leaky Bucket, Token Bucket, Fixed Window, etc.) can be used. A summary of a sliding window algorithm may be: if the number of requests served on configuration key "key" in the last "time_window_sec" seconds is more than "number_of_requests" configured for it then discard, else the request goes through while the counter is updated. The rate threshold is configurable. In some embodiments, the cloud account exceeds the rate threshold at 50 events per second. In some embodiments, the cloud account exceeds the rate threshold at 100 events per second.

If the cloud account does not exceed the threshold, the change event is processed at 228. If the cloud account does exceed the threshold, eventswitch is marked as disabled for the cloud account at 226. At 230, a collection is performed for all resources in the cloud account. The collection can be performed after a period of time. The period of time can be selected based on an expected reduction in the rate of change events. The period of time is configurable. In some embodiments, the period of time can be 15 minutes. In some embodiments, the period of time is 30 minutes. In some embodiments, the period of time is one hour. Once the collection is performed, events are again received (no longer discarded) and the process can return to 216.

Figure 3:
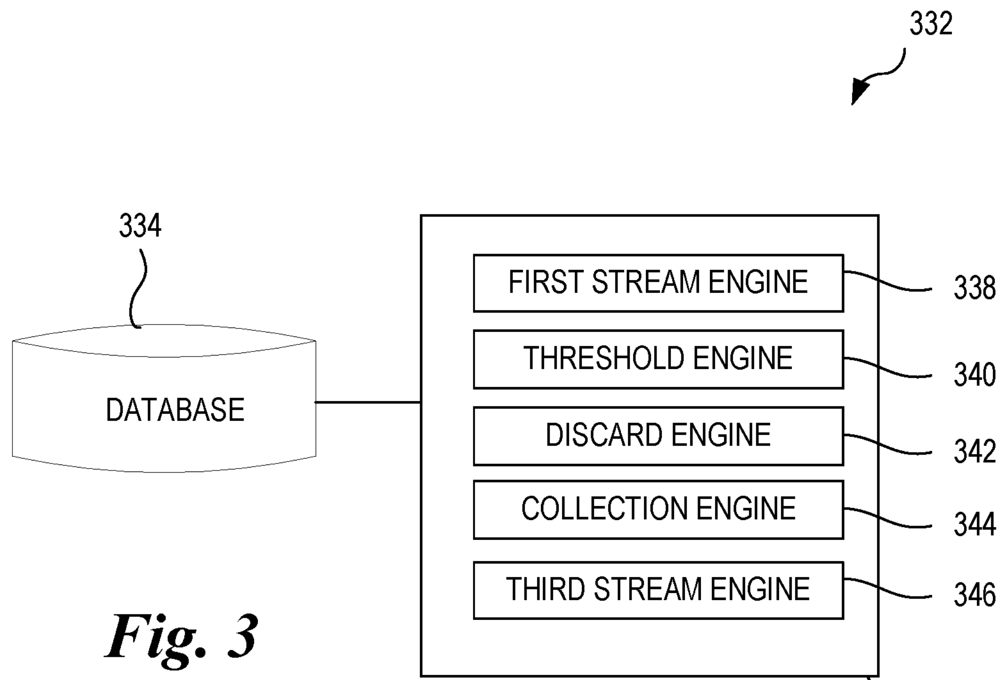
FIG. 3 illustrates a system for rate limiting cloud account change events and state management according to one or more embodiments of the present disclosure.

FIG. 3 illustrates a system 332 for rate limiting cloud account change events and state management according to one or more embodiments of the present disclosure. The system 332 can include a database 334, a subsystem 336, and/or a number of engines, for example first stream engine 338, threshold engine 340, discard engine 342, collection engine 344, and/or third stream engine 346, and can be in communication with the database 334 via a communication link. The system 332 can include additional or fewer engines than illustrated to perform the various functions described herein. The system can represent program instructions and/or hardware of a machine (e.g., machine 448 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the first stream engine 338 can include a combination of hardware and program instructions that is configured to process each of a first stream of change events received from a cloud provider and associated with any assets of a particular public cloud account. The first stream engine 338 can process a change event of the first stream of change events responsive to a determination that the change event does not cause the first stream of change events to exceed the rate threshold.

In some embodiments, the threshold engine 340 can include a combination of hardware and program instructions that is configured to determine that the first stream of change events exceeds a rate threshold. In some embodiments, the threshold engine 340 can perform a check for a flag associated with the particular public cloud account indicating that the first stream of change events exceeds the rate threshold. The threshold engine 340 can determine, for each change event of the first stream of change events, whether that change event causes the first stream of change events to exceed the rate threshold responsive to determining a lack of the flag. The threshold engine 340 can associate the flag with the particular public cloud account indicating that the first stream of change events exceeds the rate threshold responsive to a determination that a change event of the first stream of change events causes the first stream of change events to exceed the rate threshold.

In some embodiments, the discard engine 342 can include a combination of hardware and program instructions that is configured to discard each of a second stream of change events received from the public cloud provider and associated with any assets of the particular public cloud account. In some embodiments, the discard engine 342 can discard each of the second stream of change events received from the public cloud provider and associated with any assets of the particular public cloud account responsive to determining a presence of the flag.

In some embodiments, the collection engine 344 can include a combination of hardware and program instructions that is configured to query the cloud provider to perform a collection on all the assets of the particular public cloud account after a particular delay period. In some embodiments, the third stream engine 346 can include a combination of hardware and program instructions that is configured to process each of a third stream of change events received from the cloud provider and associated with any assets of the particular public cloud account responsive to a completion of the collection.

Figure 4:
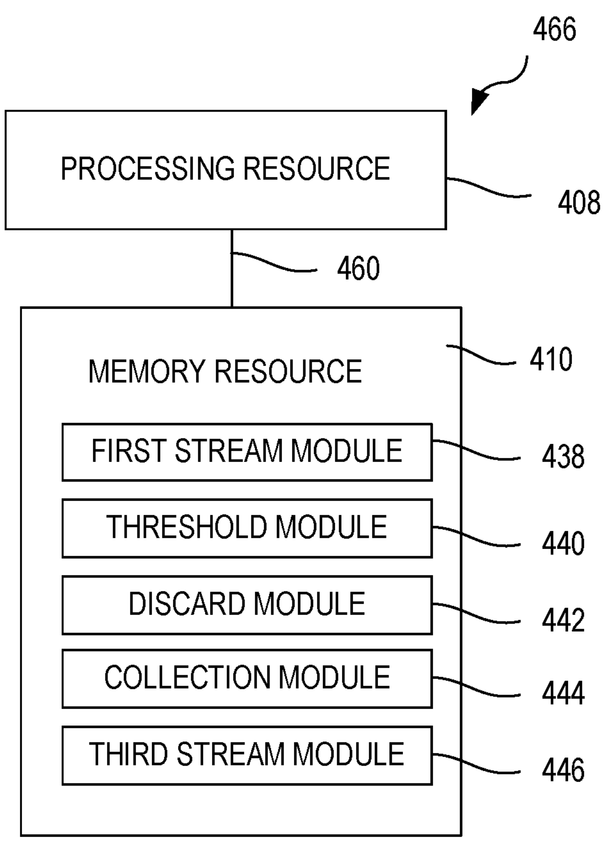
FIG. 4 is a diagram of a machine for rate limiting cloud account change events and state management according to one or more embodiments of the present disclosure.

FIG. 4 is a diagram of a machine 448 for rate limiting cloud account change events and state management according to one or more embodiments of the present disclosure. The machine 448 can utilize software, hardware, firmware, and/or logic to perform a number of functions. The machine 448 can be a combination of hardware and program instructions configured to perform a number of functions (e.g., actions). The hardware, for example, can include a number of processing resources 108 and a number of memory resources 410, such as a machine-readable medium (MRM) or other memory resources 410. The memory resources 410 can be internal and/or external to the machine 448 (e.g., the machine 448 can include internal memory resources and have access to external memory resources). In some embodiments, the machine 448 can be a virtual computing instance (VCI) or other computing device. The term "VCI" covers a range of computing functionality. The term "virtual machine" (VM) refers generally to an isolated user space instance, which can be executed within a virtualized environment. Other technologies aside from hardware virtualization can provide isolated user space instances, also referred to as data compute nodes. Data compute nodes may include non-virtualized physical hosts, VMs, containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads. The term "VCI" covers these examples and combinations of different types of data compute nodes, among others.

The program instructions (e.g., machine-readable instructions (MM)) can include instructions stored on the MRM to implement a particular function (e.g., an action such as processing streams of change events). The set of MRI can be executable by one or more of the processing resources 408. The memory resources 410 can be coupled to the machine 448 in a wired and/or wireless manner. For example, the memory resources 410 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 410 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 408 can be coupled to the memory resources 410 via a communication path 460. The communication path 460 can be local or remote to the machine 448. Examples of a local communication path 460 can include an electronic bus internal to a machine, where the memory resources 410 are in communication with the processing resources 448 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 460 can be such that the memory resources 410 are remote from the processing resources 408, such as in a network connection between the memory resources 410 and the processing resources 408. That is, the communication path 460 can be a network connection. Examples of such a network connection can include a local area network (LAN), wide area network (WAN), personal area network (PAN), and the Internet, among others.

As shown in FIG. 4, the MRI stored in the memory resources 408 can be segmented into a number of modules 438, 440, 442, 444, 446 that when executed by the processing resources 408 can perform a number of functions. As used herein a module includes a set of instructions included to perform a particular task or action. The number of modules 438, 440, 442, 444, 446 can be sub-modules of other modules. For example, the third stream module 446 can be a sub-module of the first stream module 438 and/or can be contained within a single module. Furthermore, the number of modules 438, 440, 442, 444, 446 can comprise individual modules separate and distinct from one another. Examples are not limited to the specific modules 438, 440, 442, 444, 446 illustrated in FIG. 4.

One or more of the number of modules 438, 440, 442, 444, 446 can include program instructions and/or a combination of hardware and program instructions that, when executed by a processing resource 408, can function as a corresponding engine as described with respect to FIG. 3. For example, the threshold module 440 can include program instructions and/or a combination of hardware and program instructions that, when executed by a processing resource 408, can function as the threshold engine 340.

For example, the machine 446 can include a first stream module 438, which can include instructions to process each of a first stream of change events received from a cloud provider and associated with any assets of a particular public cloud account.

For example, the machine 446 can include a threshold module 440, which can include instructions to determine that the first stream of change events exceeds a rate threshold.

For example, the machine 446 can include a discard module 442, which can include instructions to discard each of a second stream of change events received from the public cloud provider and associated with any assets of the particular public cloud account.

For example, the machine 446 can include a collection module 444, which can include instructions to query the cloud provider to perform a collection on all the assets of the particular public cloud account after a particular delay period.

For example, the machine 446 can include a third stream module 446, which can include instructions to process each of a third stream of change events received from the cloud provider and associated with any assets of the particular public cloud account responsive to a completion of the collection.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium having instructions stored thereon which, when executed by a processor, cause the processor to:

process each of a first stream of change events received from a cloud provider and associated with any assets of a particular public cloud account;

determine that the first stream of change events exceeds a rate threshold;

discard each of a second stream of change events received from the public cloud provider and associated with any assets of the particular public cloud account;

query the cloud provider to perform a collection on all the assets of the particular public cloud account after a particular delay period; and process each of a third stream of change events received from the cloud provider and associated with any assets of the particular public cloud account responsive to a completion of the collection.

2. The medium of claim 1, wherein each change event is configured to trigger collection for a particular asset associated with the change event.

3. The medium of claim 1, including instructions to perform a check for a flag associated with the particular public cloud account indicating that the first stream of change events exceeds the rate threshold.

4. The medium of claim 3, including instructions to discard each of the second stream of change events received from the public cloud provider and associated with any assets of the particular public cloud account responsive to determining a presence of the flag.

5. The medium of claim 3, including instructions to determine, for each change event of the first stream of change events, whether that change event causes the first stream of change events to exceed the rate threshold responsive to determining a lack of the flag.

6. The medium of claim 5, including instructions to process a change event of the first stream of change events responsive to a determination that the change event does not cause the first stream of change events to exceed the rate threshold.

7. The medium of claim 5, including instructions to associate the flag with the particular public cloud account indicating that the first stream of change events exceeds the rate threshold responsive to a determination that a change event of the first stream of change events causes the first stream of change events to exceed the rate threshold.

8. The medium of claim 1, wherein the first stream of change events includes a plurality of event types, and wherein the instructions include instructions to:

determine that a particular one of the plurality of event types included in the first stream of change events exceeds the rate threshold;

discard each of a second stream of change events of the particular event type received from the public cloud provider and associated with the particular public cloud account;

query the cloud provider to perform the collection on all the assets of the particular public cloud account after the particular delay period; and process each of the third stream of change events received from the cloud provider and associated with any assets of the particular public cloud account responsive to the completion of the collection, wherein the third stream of change events includes the plurality of event types.

9. The medium of claim 1, wherein the instructions include instructions to:

process each of a first stream of change events received from the cloud provider and associated with any asset types of the particular public cloud account;

determine that change events corresponding to a particular asset type of the public cloud account included in the first stream of change events exceeds the rate threshold;

discard each of a second stream of change events of the particular asset type received from the public cloud provider and associated with the particular public cloud account;

query the cloud provider to perform the collection on all the assets of the particular public cloud account after the particular delay period; and process each of a third stream of change events received from the cloud provider and associated with any asset types of the particular public cloud account responsive to a completion of the collection, wherein the third stream of change events includes the plurality of event types.

10. The medium of claim 1, wherein the instructions include instructions to:

determine that change events corresponding to a particular asset of the public cloud account included in the first stream of change events exceeds the rate threshold;

discard each of a second stream of change events corresponding to the particular asset received from the public cloud provider and associated with the particular public cloud account;

query the cloud provider to perform the collection on all the assets of the particular public cloud account after the particular delay period; and process each of the third stream of change events received from the cloud provider and associated with any assets of the particular public cloud account responsive to the completion of the collection.

11. A method, comprising:

processing each of a first stream of change events received from a cloud provider and associated with any assets of a particular public cloud account, wherein the first stream of change events includes a plurality of event types;

determining that a particular one of the plurality of event types included in the first stream of change events exceeds a rate threshold;

discarding each of a second stream of change events of the particular event type received from the public cloud provider and associated with the particular public cloud account;

querying the cloud provider to perform a collection on all the assets of the particular public cloud account after a particular delay period; and processing each of a third stream of change events received from the cloud provider and associated with any assets of the particular public cloud account responsive to a completion of the collection, wherein the third stream of change events includes the plurality of event types.

12. The method of claim 11, wherein the method includes determining the particular delay period based on an expected reduction in a rate of received change events.

13. The method of claim 11, wherein the collection on all the assets of the particular public cloud account includes a collection of a current state of all the assets of the particular public cloud account.

14. The method of claim 11, wherein the method includes updating a graph model associated with the particular public cloud account subsequent to the performance of the collection.

15. A system, comprising:

a first stream engine configured to process each of a first stream of change events received from a cloud provider and associated with any assets of a particular public cloud account;

a threshold engine configured to determine that the first stream of change events exceeds a rate threshold;

a discard engine configured to discard each of a second stream of change events received from the public cloud provider and associated with any assets of the particular public cloud account;

a collection engine configured to query the cloud provider to perform a collection on all the assets of the particular public cloud account after a particular delay period; and a third stream engine configured to process each of a third stream of change events received from the cloud provider and associated with any assets of the particular public cloud account responsive to a completion of the collection.

16. The system of claim 15, wherein the threshold engine is configured to perform a check for a flag associated with the particular public cloud account indicating that the first stream of change events exceeds the rate threshold.

17. The system of claim 16, wherein the discard engine is configured to discard each of the second stream of change events received from the public cloud provider and associated with any assets of the particular public cloud account responsive to determining a presence of the flag.

18. The system of claim 16, wherein the threshold engine is configured to determine, for each change event of the first stream of change events, whether that change event causes the first stream of change events to exceed the rate threshold responsive to determining a lack of the flag.

19. The system of claim 18, wherein the first stream engine is configured to process a change event of the first stream of change events responsive to a determination that the change event does not cause the first stream of change events to exceed the rate threshold.

20. The system of claim 18, wherein the threshold engine is configured to associate the flag with the particular public cloud account indicating that the first stream of change events exceeds the rate threshold responsive to a determination that a change event of the first stream of change events causes the first stream of change events to exceed the rate threshold.

* * * * *